United States Patent [19]
Kuratsuji et al.

[11] Patent Number: 6,120,790
[45] Date of Patent: Sep. 19, 2000

[54] THERMOPLASTIC RESIN COMPOSITION

[75] Inventors: Takatoshi Kuratsuji; Jerome Maillet; Yoshiyuki Miyaki, all of Kyoto, Japan

[73] Assignee: Elf Atochem S.A., France

[21] Appl. No.: 09/000,046

[22] PCT Filed: May 16, 1997

[86] PCT No.: PCT/EP97/02602

§ 371 Date: May 13, 1998

§ 102(e) Date: May 13, 1998

[87] PCT Pub. No.: WO97/44387

PCT Pub. Date: Nov. 27, 1997

[30] Foreign Application Priority Data

May 20, 1996 [JP] Japan ..................................... 8-124381

[51] Int. Cl.⁷ ........................... A61K 33/38; C08L 71/00; A01N 25/10
[52] U.S. Cl. .......................... 424/443; 424/404; 424/405; 424/409; 424/412; 514/495; 514/953
[58] Field of Search .................................. 424/405, 409, 424/404, 443, 412; 428/35.3, 543; 514/495, 953

[56] References Cited

U.S. PATENT DOCUMENTS

| | | | |
|---|---|---|---|
| 4,739,012 | 4/1988 | Hagman | 525/92 |
| 5,607,683 | 3/1997 | Capelli | 424/405 |
| 5,820,918 | 10/1998 | Ronan et al. | 427/2.1 |

FOREIGN PATENT DOCUMENTS

WO 96/01119 1/1996 WIPO .

OTHER PUBLICATIONS

Terui, *Chemical Abstracts*, vol. 117, #9236, 1992.

*Primary Examiner*—Robert H. Harrison
*Attorney, Agent, or Firm*—Smith Gambrell & Russell, LLP

[57] ABSTRACT

Purpose: the purpose of the present invention is to offer resin compositions which have antimicrobial/fungistatic properties which show outstanding dispersion and outstandingly durable performance. Constitution: thermoplastic resin compositions characterized in that an antimicrobial/fungistatic agent, and particularly an inorganic antimicrobial/fungistatic agent, is compounded with a copolymer containing a polyether chain as a constituent unit, such as a polyether/polyamide copolymer, a polyether/polyester copolymer or a polyether urethane, for example, at 0.05–20 wt. %, and thermoplastic resin compositions which comprise a thermoplastic resin, an antimicrobial/fungistatic agent and a copolymer having a polyether chain as a constituent unit.

4 Claims, No Drawings

THERMOPLASTIC RESIN COMPOSITION

BACKGROUND OF THE INVENTION

1. Field of the Invention

The present invention relates to thermoplastic resin compositions, and more specifically to resin compositions compounded with an antimicrobial/fungistatic agent. The purpose thereof is to offer antimicrobial/fungistatic resin compositions with good dispersion when used as moulded products or as resin improving agents.

2. Description of the Prior Art

Prior compositions are known for conferring antimicrobial/fungistatic properties on resins. There are a variety of antimicrobial/fungistatic agents, including natural products, organic compounds and inorganic compounds; however, in the main, natural products have a low boiling point and are difficult to handle. Organic compounds show good phase solubility with resins, but are not very heat stable, and there is the problem of a lowering of performance due to decomposition in the process of melting, etc. Inorganic compounds on the other hand are exceedingly stable but have the problem of lowered performance due to poor dispersion in resins and elution by water.

The present invention is intended to offer compositions in which these antimicrobial/antifungal agents disperse well in the resin, are stable and are not eluted to any extent, and have an outstandingly persistent effect; and we have discovered that this purpose can be achieved by compounding with specified resins.

SUMMARY OF THE INVENTION

The present invention is a thermoplastic resin composition characterized in that an antimicrobial/fungistatic agent is compounded at 0.05–20 wt % with a polymer containing a polyether chain as a constituent unit.

The "antimicrobial/fungistatic agent" in the present invention includes natural products (cypress thiol, chitin, chitosan, etc.), organic compounds (imidazoles, thiazoles, nitrites, haloalkylthio compounds, pyridines, thiazines, bromine compounds, quaternary ammonium compounds, etc.) and inorganic compounds (zeolites, zirconium phosphate, calcium phosphate, titania and silica, etc.); however, inorganic compounds including silver ions are particularly preferred.

The "polymer containing a polyether chain as a constituent unit" in the present invention is a block copolymer in which a polyoxyalkylene chain is connected to another macromolecular chain, or a polymer in which polyoxyalkylene chains are linked via linking portions. Examples of polyoxyalkylenes here include polyoxyethylene, poly(1,2- and 1,3-oxypropylene), polyoxytetramethylene, polyoxyhexamethylene, block and random copolymers of ethylene oxide and propylene oxide, and block and random copolymers of ethylene oxide and tetrahydrofuran, etc. The alkylene portion particularly preferably has 2–4 carbons, and polyoxyethylene and polyoxytetramethylene are most preferred.

The number average molecular weight of the polyoxyalkylene is preferably in the range 300–6000, and more preferably 500–4000.

Within the present invention polyether/polyamide block copolymers, polyether/polyester block copolymers and polyether urethanes are preferably used as the "polymer containing a polyether chain as a constituent unit".

Within the present invention a "polyether/polyamide block copolymer" is a copolymer in which a poly(alkylene oxide) chain (a) is linked with a polyamide chain (b) which is a polymer of an aminocarboxylic acid or a lactam of 6 carbons or a salt of a dicarboxylic acid and a diamine of 6 carbons. Copolymers in which (a) and (b) are linked via a dicarboxylic acid of 4–20 carbons are termed generally polyether ester amides. These polymers can be made, for example, by the method of Japanese Examined Patent 56-45419. Concrete examples include Pebax (Elf-Atochem), Ely (Ems) and Vestamide (Hüls). The types and proportions of the polyamide component and polyether component in block copolymers used in the present invention can be selected according to the purpose and end use.

As aminocarboxylic acids or lactams of 6 carbons or salts of a dicarboxylic acid and a diamine of 6 carbons here, 11-aminoundecanoic acid, 12-aminododecanoic acid, caprolactam, laurolactam, hexamethylenediamine adipic acid salt and hexamethylenediamine sebacic acid salt are preferably used. Two or more of the aforementioned components (a) can also be used concomitantly.

Within the present invention a "polyether/polyester block copolymer" is a polymer in which a poly(alkylene oxide) chain (a) is linked with a polyester chain (c) which is a polymer of an oxycarboxylic acid of 6 carbons or a dihydroxy compound of 2 carbons and an aromatic dicarboxylic acid. Two or more of the aforementioned components (c) can also be used together. These polymers are discussed in detail, for example, in the specification of U.S. Pat. No. 4,739,012 (Dupont Co.). Concrete examples include Hytrel (Dupont), Pelprene P series (Toyobo), and Rekuse (Taijin), etc. The percentages by weight of aforementioned component (a) and component (c) in the block copolymer used in the present invention can be decided according to the purpose and end use. Even though they are similar thermoplastic elastomers, polyester/polyester block copolymers (e.g. Pelprene S series) give little benefit.

Within the present invention a "polyether urethane" is a thermoplastic polyurethane in which a polyether is used as soft segments; polyester type or caprolactam type polyurethanes give little benefit. In concrete terms these polyurethanes are ordinarily obtained by reacting an organic diisocyanate with a polyether of a molecular weight of 500–6000, and optionally lengthened in the presence of a catalyst. Toluylene diisocyanate and diphenylmethane diisocyanate, etc., are preferably employed as the isocyanate, and polytetramethylene glycol and poly(propylene oxide), etc., as the polyether.

Within the present invention these polyether/polyamide block copolymers, polyether/polyester block copolymers and polyether urethanes can be used singly, or in mixtures, or in mixtures of 2 or more block copolymers differing in the ratio of soft segments/hard segments in the resin; moreover, blends with other resins within a range within which the purpose of the present invention is achieved can also be employed.

Within the present invention the antimicrobial/fungistatic agent is compounded in the proportion 0.05–20 wt % with a polymer containing a polyether. At less than the lower limit the antimicrobial/fungistatic agent has little effect, and at more than the upper limit it is difficult to disperse adequately even when the present resin is employed. There is good dispersion in the present resin compositions, and surprisingly the effect is persistent and there is little elution on treatment with liquids such as water, etc. The detailed reasons for this are not clear, but the fact that there is little benefit with polyester elastomers or polyurethane using an aliphatic polyester in soft segments suggests that it may be due to coordination and trapping of metal ions in the ether portion.

Resin compositions of the present invention can be extruded as they stand as sheets, films or fibres, and can be made into injection moulded products having antimicrobial/fungistatic properties, such as wrapping material, wall paper and clothing, etc.; or they can be used in compounds with other thermoplastic resins. Other thermoplastic resins with which the present resin compositions can be compounded include polyethylene, polypropylene, poly(vinyl chloride), polycarbonate and ABS resin; they can also be used with other resins with which it is difficult to compound an antimicrobial/fungistatic agent.

When it is used compounded with another thermoplastic resin, it is desirable that 0.01–4 parts by weight of antimicrobial/fungistatic agent and 1–20 parts of polymer containing a polyether chain as a constituent unit are compounded with 100 parts of the thermoplastic resin. It is particularly desirable, when antistatic properties are not needed in the thermoplastic resin composition finally obtained, that the quantity of polymer containing a polyether chain as a constituent unit that is added is 1–15 parts by weight; and 2–10 parts by weight is more desirable.

Prior known antioxidants, thermolysis-preventing agents, ultraviolet absorbing agents, hydrolysis-resistant improvers, colourings (dyes, pigments), antistatic agents, electrical conductors, crystal nucleating agents, crystallization promoters, plasticizers, lubricants, release agents, flame retardants and flame retarding aids, etc., can be incorporated at will into resin compositions of the present invention within ranges which will not detract from the properties of the present invention.

EXAMPLES

The present invention is explained in concrete terms below by means of embodiments, but needless to say the present invention is not restricted to these alone.

Example 1

The polyether/polyamide block copolymer Pebax A (Elf Atochem) was dried, and then Novalon AG300 (an inorganic compound (zeolite) carrying silver ions, mean particle size 0.7 $\mu$m, made by Toagosei) was compounded with it at 8 wt %, dry blended, and extruded at 200 C using an extruder fitted with a mixing screw and a 3-mm diameter nozzle at the end, to make pellets PEBAX A is made of PA-12 blocks of Mn 2600 and Polyethylene glycol (PEG) blocks of Mn 650. This composition was mixed with 7 times the quantity of the same Pebax A, and after blending the pellets to give a final content of Novalon AG300 of 1 wt % it was extruded into a 20 $\mu$m thick film in an extruder fitted with a T dye. The film obtained was a light white colour all over and there were no visible particle agglomerations, showing good dispersion.

Example 2

As in example 1, 8 wt % master pellets were made and then these were diluted 8 fold and a 20-m Pebax 1041 film was made, except that Seebio ZO-100 (inorganic compound without silver ions, mean particle size 0.4 m, made by Hoyu Systems) was used instead of Novalon AG300. Despite the fact that the mean particle size of the antimicrobial/fungistatic agent was ca. ½ of Novalon, many particle agglomerations were visible.

Example 3

When Novalon AG300 was blended with Pebax A at 1 wt % without forming master pellets and a 20 $\mu$m thick film was made directly by the extruder, the resulting film showed the same good dispersion as in example 1.

Examples 4–6, Comparison Examples 1–2

Pebax A (polyether/polyamide block copolymer, example 4), Pelprene P-55B (polyether/polyester block copolymer made by Toyobo, example 5), Pelprene S-1001 (polyester/polyester block copolymer made by the same company, Comparison Example 1), Toyobo Urethane E3080A (polyether urethane made by Toyobo, example 6) and E1080A (polyester urethane made by the same company, Comparison Example 2) were used instead of Pebax A in example 3, blended with Novalon AGZ330 at 1 wt % and made into 25 $\mu$m film comprising the respective polymers by the same procedure as in example 3; slight particle agglomeration was noted in the S-1001 and Urethane E1080A films, but no particle agglomerations were visible in the other films. NOVALON AGZ 330 has a particle size a little bigger (1,3$\mu$) as AG 300 and contains also zinc in addition to silver.

These films were cut into 50-mm squares which were heat-sealed on 3 sides to make 10 small bags from each sheet. Of these, 5 were cleaned by immersion for 3 hours in warm water at 60 C, followed by drying. One strawberry was put into each bag, including the uncleaned bags, and they were left at room temperature. No great change was visible after 10 days in strawberries in bags made of film from polyether type polymers, whether washed in warm water or not, whereas strawberries in bags of film from polyester type polymers washed in warm water were slightly black after 1 week, and produced a slightly greenish white mould after 10 days.

Example 7

A poly(vinyl chloride) resin composition was obtained by compounding poly(vinyl chloride) 100 parts by weight, dioctyl phthallate 35 parts by weight, an epoxy plasticizer 5 parts by weight and an organotin stabilizer 2 parts by weight with 10 parts by weight of the master pellets of example 1 based on Pebax A with 8% Novalon AG300. No agglomerates were seen in 1-mm thick sheets made by pressing, and the sheets showed good mechanical strength and antimicrobial properties.

Example 8

100 parts by weight of ABS resin (Toyolac Perel TP10) was blended and pelleted with 10 parts by weight of the master pellets of example 1 based on Pebax A with 8% Novalon AG300, and injection moulded to give a 1-mm thick sheet. No agglomerates were visible in the resulting sheet, which showed good mechanical strength and antimicrobial properties.

DESCRIPTION OF SPECIFIC EMBODIMENTS

As explained above, by means of the present invention it is possible to obtain thermoplastic resin compositions with outstanding mechanical properties, in which an antimicrobial/fungistatic agent is well dispersed and has an effect which persists for a long time.

What is claimed is:

1. Thermoplastic resin composition in the form of a molded or film product consisting essentially of an antimicrobial/fungistatic agent compounded at 0.05–20 wt % with a polymer containing a polyether chain as a constituent unit.

2. Thermoplastic film composition according to claim 1, wherein the antimicrobial/fungistatic agent is an inorganic compound which includes silver ions.

3. Thermoplastic film composition according to claim 1, wherein the polymer containing a polyether chain as a constituent unit is at least one selected from the group consisting of polyether/polyamide block copolymers, polyether/polyester block copolymers and polyether urethanes.

4. Thermoplastic resin composition in the form of a molded or film product consisting essentially of 0.01–4 parts by weight of an antimicrobial/fungistatic agent and 1–20 parts by weight of a polymer containing a polyether chain as a constituent unit compounded with 100 parts by weight of a thermoplastic resin composition.

* * * * *